United States Patent
Papple et al.

(10) Patent No.: US 9,982,890 B2
(45) Date of Patent: May 29, 2018

(54) COMBUSTOR DOME HEAT SHIELD (71) Applicant: Pratt & Whitney Canada Corp., Longueuil (CA)

(72) Inventors: Michael Papple, Verdun (CA); Robert Sze, Mississauga (CA); Sri Sreekanth, Mississauga (CA)

(73) Assignee: PRATT & WHITNEY CANADA CORP., Longueuil, QC (CA)

( * ) Notice: Subject to any disclaimer, the term of this patent is extended or adjusted under 35 U.S.C. 154(b) by 540 days.

(21) Appl. No.: 14/085,011

(22) Filed: Nov. 20, 2013

(65) Prior Publication Data

US 2015/0135720 A1 May 21, 2015

(51) Int. Cl.
| | |
|---|---|
| F23R 3/16 | (2006.01) |
| F23R 3/00 | (2006.01) |
| F01D 5/18 | (2006.01) |
| F23R 3/54 | (2006.01) |
| F23R 3/60 | (2006.01) |
| F23R 3/50 | (2006.01) |
| F23R 3/28 | (2006.01) |
| F23R 3/36 | (2006.01) |
| F23R 3/04 | (2006.01) |

(Continued)

(52) U.S. Cl.
CPC .............. *F23R 3/16* (2013.01); *F01D 5/186* (2013.01); *F01D 5/187* (2013.01); *F23R 3/002* (2013.01); *F23R 3/005* (2013.01); *F23R 3/007* (2013.01); *F23R 3/283* (2013.01); *F23R 3/50* (2013.01); *F23R 3/54* (2013.01); *F23R 3/60* (2013.01); *F23R 3/04* (2013.01); *F23R 3/045* (2013.01); *F23R 3/06* (2013.01); *F23R 3/14* (2013.01); *F23R 3/20* (2013.01); *F23R 3/28* (2013.01); *F23R 3/36* (2013.01); *F23R 2900/00001* (2013.01); *F23R 2900/00005* (2013.01); *F23R 2900/00012* (2013.01); *F23R 2900/00017* (2013.01); *F23R 2900/00018* (2013.01); *F23R 2900/00019* (2013.01); *F23R 2900/03042* (2013.01); *F23R 2900/03044* (2013.01); *F23R 2900/03045* (2013.01); *Y02T 50/675* (2013.01)

(58) Field of Classification Search
CPC .... F23R 3/045; F23R 3/04; F23R 3/06; F23R 3/54; F23R 3/16; F23R 2900/03041; F23R 2900/03042; F23R 2900/03043; F23R 2900/03044; F23R 2900/03045; F23R 3/002

See application file for complete search history.

(56) References Cited

U.S. PATENT DOCUMENTS 5,129,231 A 7/1992 Becker et al.
6,497,105 B1 * 12/2002 Stastny ................... F23R 3/283
29/890.01

(Continued)

*Primary Examiner* — Gerald Luther Sung
*Assistant Examiner* — Scott Walthour
(74) *Attorney, Agent, or Firm* — Norton Rose Fulbright Canada LLP (57) ABSTRACT

A combustor heat shield has lips with fins distributed on the lips. The lip-fins have an extended end portion projecting rearwardly from the back face of the heat shield. Impingement jets may be directed against the rearwardly extended end portions of the lip-fins to enhance cooling. The heat shield may define a fuel nozzle opening surrounded by a rail on the back side of the heat shield. Impingement holes or slots may be defined in the rail for allowing cooling air passing therethrough to impinge upon the lip-fins.

17 Claims, 7 Drawing Sheets (51) Int. Cl.
*F23R 3/20* (2006.01)
*F23R 3/14* (2006.01)
*F23R 3/06* (2006.01)

(56) References Cited

U.S. PATENT DOCUMENTS

| | | | |
|---|---|---|---|
| 6,792,757 B2 * | 9/2004 | Borns | F23R 3/10 60/39.11 |
| 6,901,758 B2 | 6/2005 | Grady et al. | |
| 7,007,481 B2 * | 3/2006 | McMasters | F23M 5/085 60/752 |
| 7,665,306 B2 | 2/2010 | Bronson et al. | |
| 7,748,221 B2 * | 7/2010 | Patel | F23R 3/10 60/752 |

* cited by examiner

Fig-8

COMBUSTOR DOME HEAT SHIELD

TECHNICAL FIELD

The invention relates generally to gas turbine engine combustors and, more particularly, to combustor dome heat shields.

BACKGROUND OF THE ART

Heat shields, which protect the dome panel of combustor shells, are exposed to hot gases in the primary combustion zone. The amount of coolant available for cooling the heat shields must be minimized to improve the combustion efficiency and to reduce the smoke, unburned hydrocarbon and CO/NOx emission.

There is a continuing need for improved heat shields and cooling schemes.

SUMMARY

In one aspect, there is provided a heat shield for a combustor of a gas turbine engine, comprising a heat shield panel adapted to be mounted to an inside of a dome of the combustor with a back face of the heat shield panel in spaced-apart facing relationship with an inner surface of the dome, the heat shield configured to receive a flow of cooling air along said back face, at least one radially inner or outer lip along a periphery and projecting downstream of the heat shield panel relative to the flow of cooling air, an array of lip-fins provided on the at least one of the radially inner or outer lip, the lip-fins having extended end portions projecting upstream from the back face of the heat shield panel.

In a second aspect, there is provided a combustor comprising a combustor shell circumscribing a combustion chamber, the combustor shell having a dome, at least one circumferential array of dome heat shield panels mounted to an inner side of the dome of the combustor shell, the dome heat shield panels having a back face disposed in a spaced-apart facing relationship with the interior side of the dome, the back face of the dome heat shield panels and the dome defining an air gap therebetween, each of the dome heat shield panels having radially inner and outer lips projecting forwardly between opposed lateral edges of the dome heat shield panel, inner and outer arrays of lip-fins respectively provided along the radially inner and outer lips, the lip-fins having extended end portions projecting rearwardly relative to the back face of each dome heat shield.

In accordance with another aspect, there is provided a method of cooling combustor heat shields mounted in a combustor of a gas turbine engine, the method comprising: convection cooling a combustor heat shield by passing coolant through impingement passages defined in the combustor heat shield; impingement cooling the combustor heat shield by directing the coolant discharged from the impingement passages against extended end portions of lip-fins projecting rearwardly from peripheral lips of the heat shield, and then, still using the same flow of coolant, convection cooling the remainder of the lip-fins by allowing the coolant impinging upon the extended end portions of the lip-fins to flow forwardly over the lip-fins.

DESCRIPTION OF THE DRAWINGS

Reference is now made to the accompanying figures, in which.

DETAILED DESCRIPTION

Figure 1:
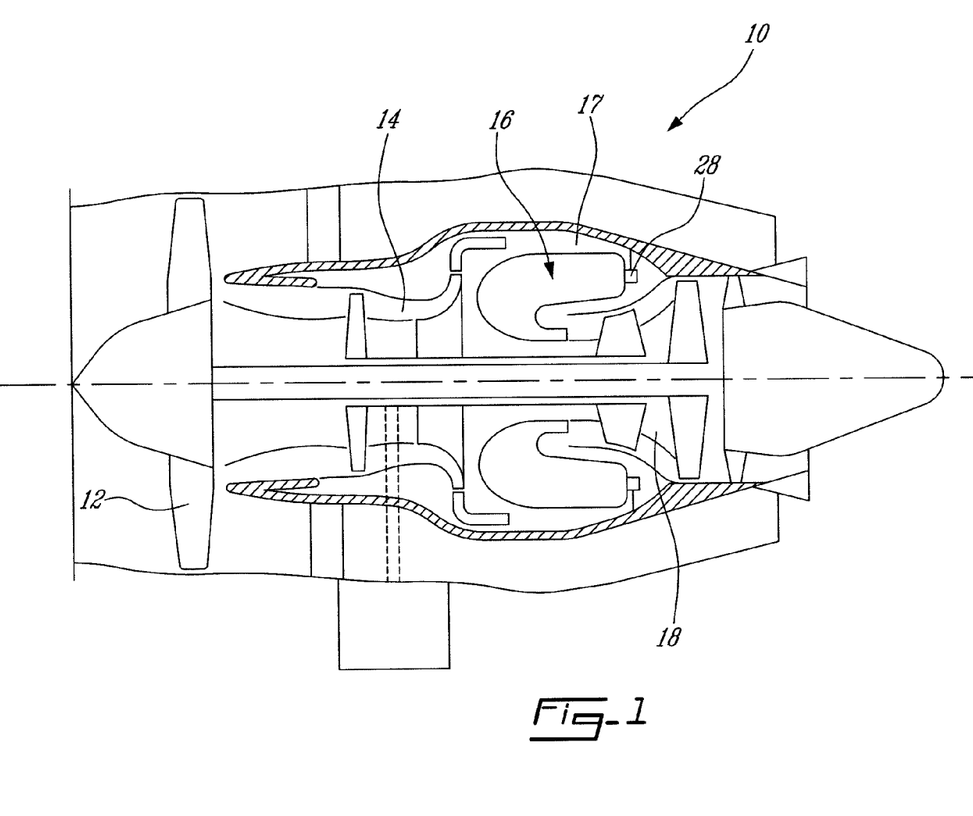
FIG. 1 is a schematic cross-section view of a turbofan engine having a reverse flow annular combustor and dome panel heat shields.

FIG. 1 illustrates a gas turbine engine 10 of a type preferably provided for use in subsonic flight, generally comprising in serial flow communication a fan 12 through which ambient air is propelled, a multistage compressor 14 for pressurizing the air, a combustor 16 in which the compressed air is mixed with fuel and ignited for generating an annular stream of hot combustion gases, and a turbine section 18 for extracting energy from the combustion gases.

Figure 2:
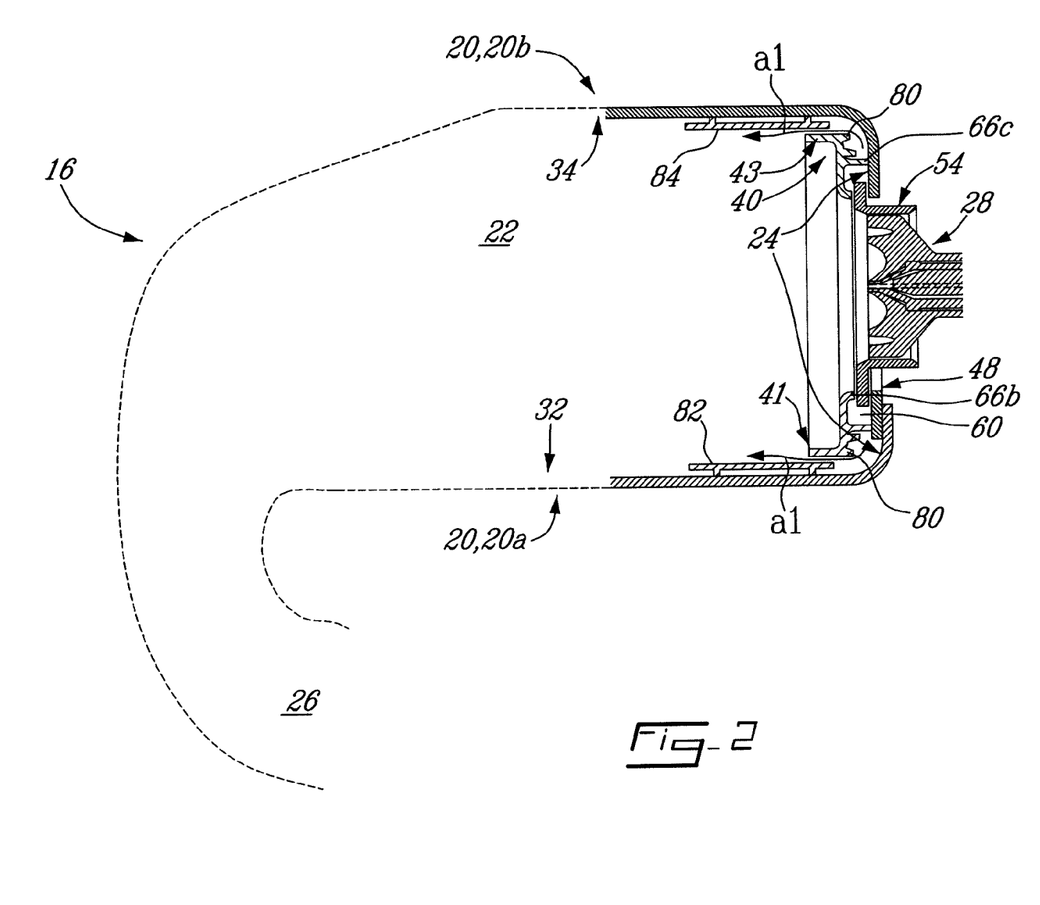
FIG. 2 is an enlarged view of the combustor of the engine shown in FIG. 1.

The combustor 16 is housed in a plenum 17 supplied with compressed air from compressor 14. As shown in FIG. 2, the combustor 16 may comprise a reverse flow annular combustor shell 20 including a radially inner liner 20a and a radially outer liner 20b, defining a combustion chamber 22. The combustor 16 has a bulkhead defining an inlet dome portion including a dome panel 24. The combustor 16 further has an exit portion 26 for communicating combustion gases with the turbine section 18. As shown in FIG. 1, a plurality of fuel nozzles 28 are mounted to extend through the dome panel 24 of the combustor 16 to deliver a fuel-air mixture to the chamber 22.

A plurality of effusion holes (not shown) are defined in the inner and outer liners 20a and 20b for cooling purposes, and dilution holes (not shown) may also be provided for combustion purposes. Inner and outer liners 20a and 20b may have any suitable configuration, and thus are shown in dotted line only in FIG. 2. The inner and outer liners 20a and 20b are typically made out of sheet metal, though any suitable material(s) and manufacturing method(s) may be used. A thermal barrier coating (not shown) may be applied to the inner or combustion facing surfaces 32, 34 of the liners 20a and 20b to protect them against the high temperatures prevailing in the combustion chamber 22.

Circumferentially distributed dome heat shield panels 40 (only one shown in cross-section in FIG. 2) are mounted inside the combustion chamber 22 to protect the dome panel 24 from the high temperatures in the combustion chamber 22. The dome heat shield panels 40 are typically castings made out of high temperature capable materials. Each dome heat shield panel 40 has a plurality of threaded studs 42 (six according to the example shown in FIGS. 3 and 5) extending from a back face of the heat shield and through corresponding mounting holes (not shown) defined in the combustor dome. Self-locking nuts (not shown) are threadably engaged on the studs from outside of the combustion chamber 22 for holding the dome heat shield panels 40 tightly against the combustor dome.

As shown in FIG. 2, circumferentially spaced-apart fuel nozzle opening 48 are defined through the dome panel 24 for allowing mounting of the fuel nozzles 28 to the combustor 16. At least one corresponding fuel nozzle opening 50 (two in the example illustrated in FIGS. 3 and 5) is defined in each of the dome heat shield panels 40 and is aligned with a corresponding fuel nozzle opening 48 in the combustor dome 24 for accommodating an associated fuel nozzle therein. As illustrated in FIG. 2, a floating collar 54 is mounted in the nozzle opening 48 to provide sealing between the combustor shell 20 and the fuel nozzles 28 while allowing relative movement therebetween. The fuel nozzles 28 are slidably received in the floating collars 54. The floating collars 54 are axially trapped between the heat shields 40 and the dome panel 24. The fuel nozzle openings 48 are slightly oversized relative to the floating collars 54, thereby allowing limited radial movement of the collars 54 with the fuel nozzles 28 relative to the combustor shell 20.

Figure 7:
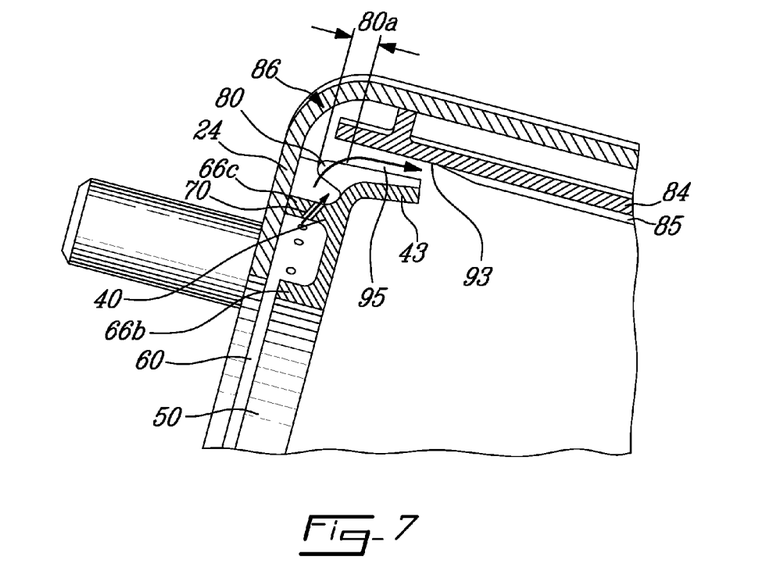
FIG. 7 is a section view illustrating a combustor dome heat shield and a radially outer front heat shield mounted to the inner surface of a combustor shell.

As shown in FIGS. 2 and 7, the dome heat shield panels 40 are spaced from the dome panel 24 so as to define a heat shield back face cooling air space or air gap 60. Relatively cool air from plenum 17 is admitted in the air gap 60. The impingement hole patterns are arranged in the dome panel 24 of the combustor shell 20 to optimize the heat shield cooling, in co-operation with heat exchange promoting structures, such as pin fins 61 extending from the back face of the heat shield panels 40.

Figure 3:
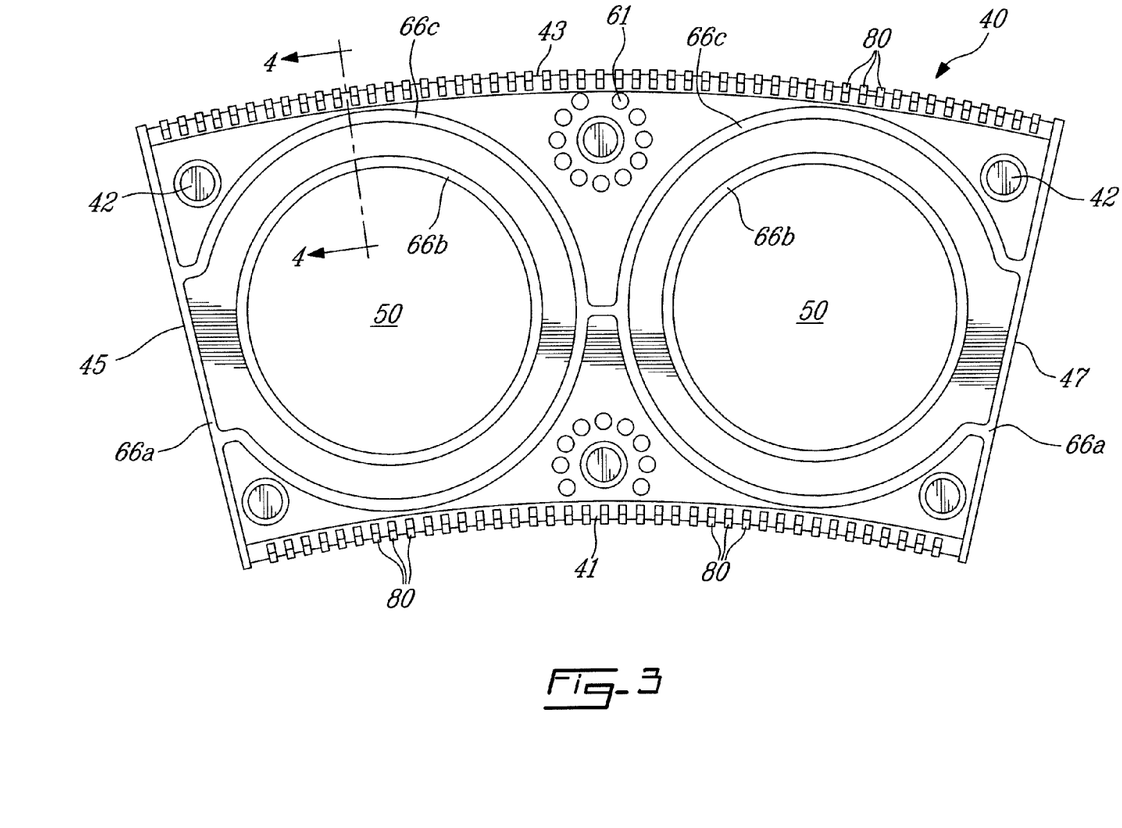
FIG. 3 is a rear view of a combustor dome heat shield of the combustor shown in FIG. 2, the pin fins on the back of the heat shield being omitted for clarity.
Figure 5:
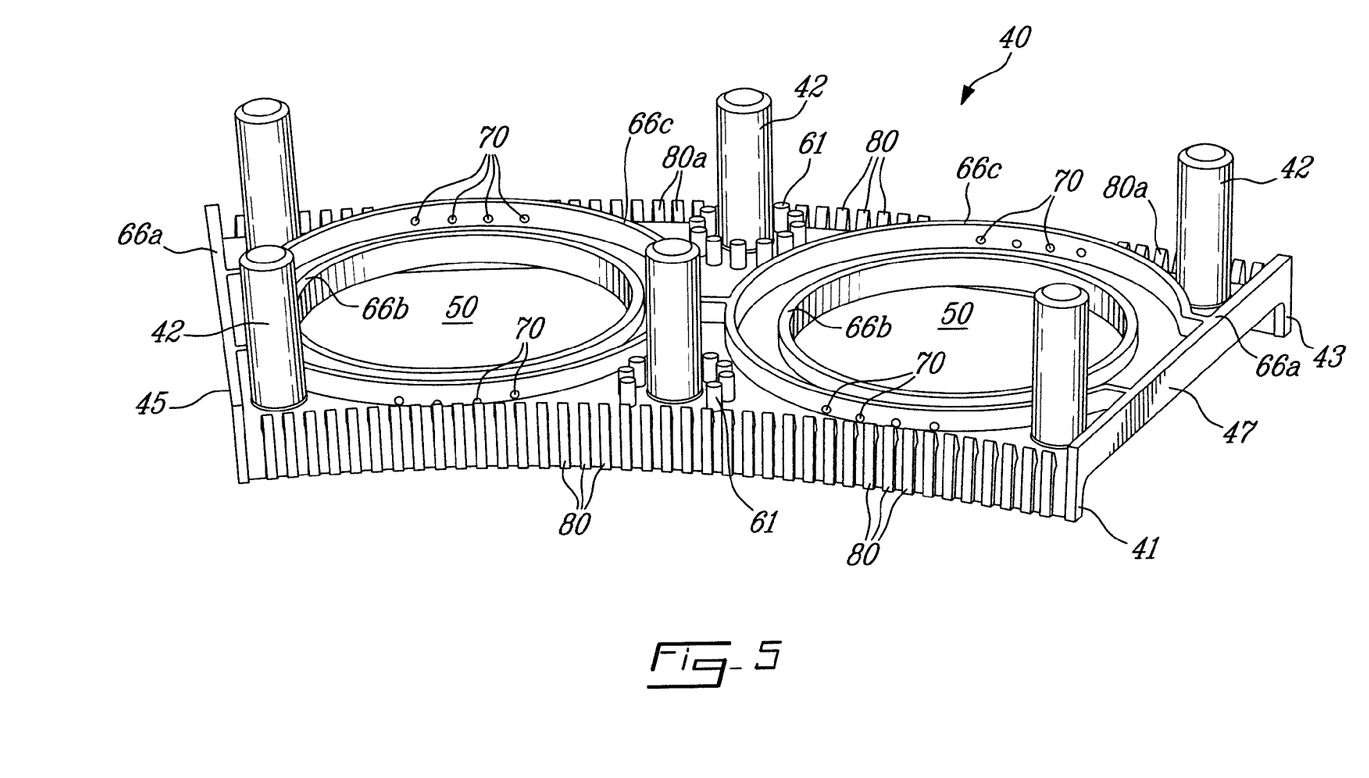
FIG. 5 is an isometric view of the back face of the combustor dome heat shield shown in FIG. 3 and illustrating impingement holes defined in an outer sealing rail of the heat shield, the impingement holes being aimed at the rearwardly extended end portions of lip-fins provided at the radially outer and inner lips of the heat shield.

Now referring more particularly to FIGS. 3 and 5, it can be seen that each individual heat shield panel 40 is provided in the form of a circular sector having radially inner and outer lips 41, 43 projecting forwardly from the front face of the panel between lateral edges 45, 47. Rails 66 a, b, c integrally extend from the back face 91 of the heat shield panels 40 to strengthen the heat shield and direct the flow of cooling air as desired. Some of the rails 66 a, c may extend from the heat shield back face all the way into sealing contact with the inner surface of the dome panel 24 and, thus, more or less act as sealing rails to compartmentalize the air gap 60, thereby directing the cooling air to the various regions of the dome heat shields. For instance, the rails 66 a, b, c may include lateral rails 66a and inner rings 66b and outer rails 66c concentrically disposed about each fuel nozzle opening 50. The outer rails 66c project further away from the back face of the dome heat shield panel 40 than the inner rings 66b (i.e. the outer rails 66c have a greater height than the inner rings 66b). As shown in FIG. 7, the outer rails 66c extend completely through the air gap 60 into sealing engagement with the dome panel 24. In contrast, the inner ring 66b only projects about half way through the air gap 60. The outer rails 66c are mainly circular and concentric with the inner rings in FIG. 3, however non-circular outer rails are possible.

Figure 4:
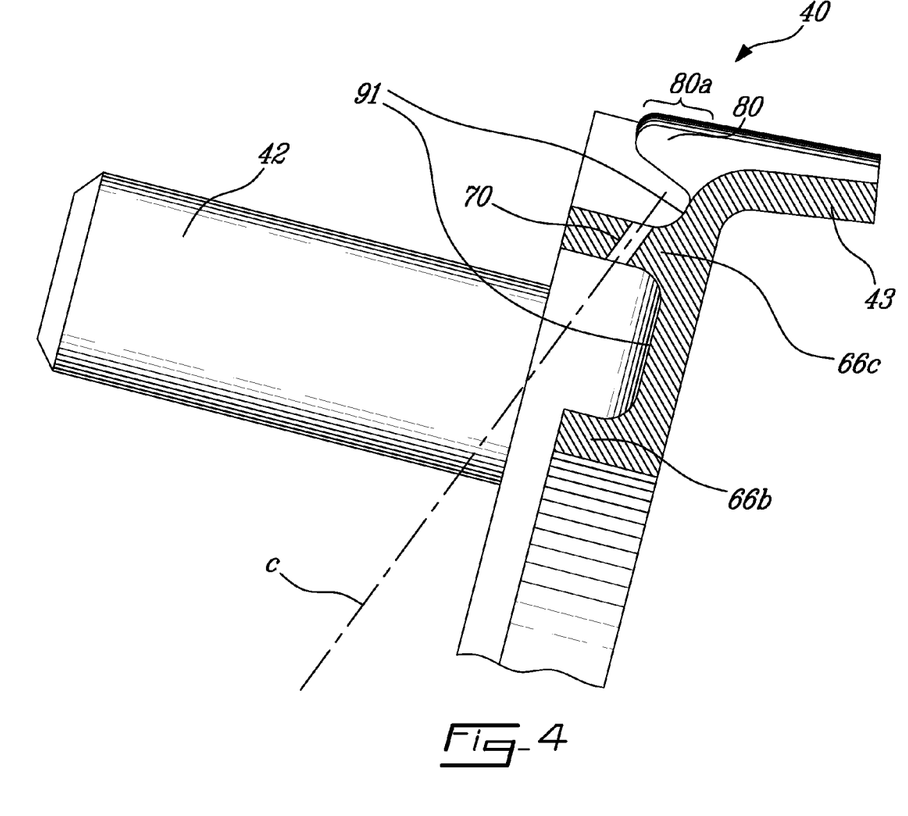
FIG. 4 is a cross-section view along line 4-4 in FIG. 3 and illustrating the orientation of the impingement holes relative to the lip-fins and the inner ring of the dome heat shield, the pin fins on the back of the heat shield being omitted for clarity.
Figure 6:
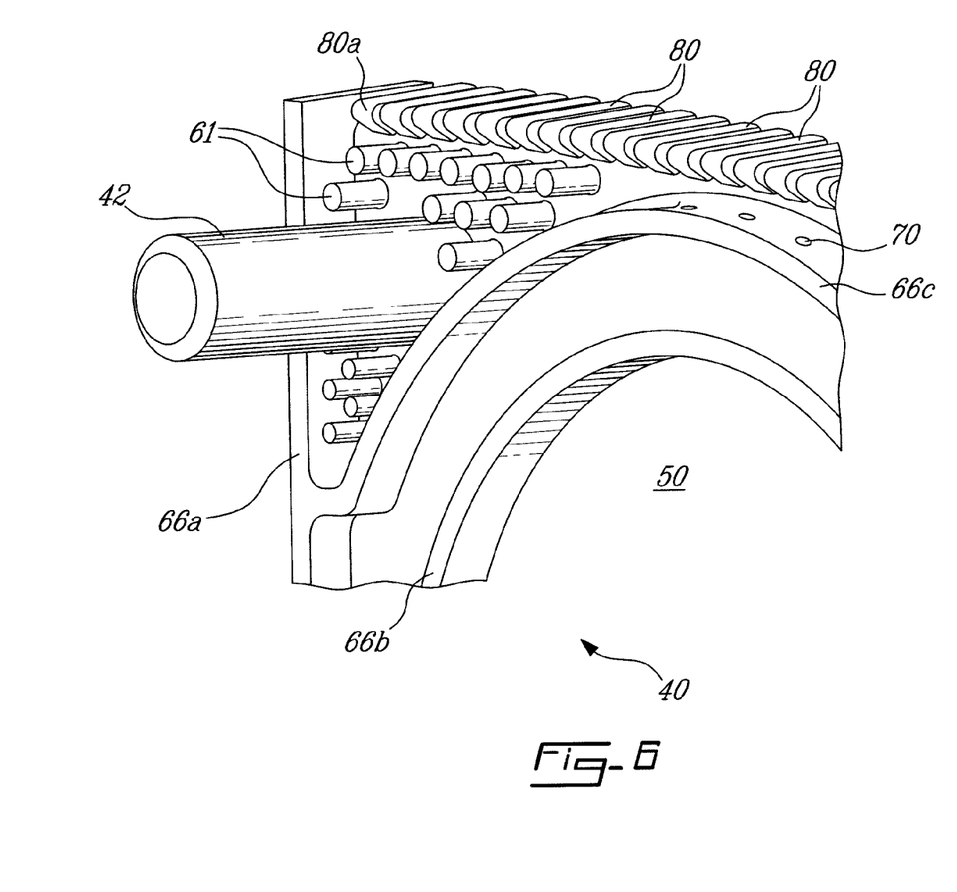
FIG. 6 is an enlarged view of a radially outer corner region of the combustor dome heat shield and illustrating the lip-fins projecting rearwardly from the back face of the heat shield and the impingement holes in the outer rail aimed at the lip fins.

Referring concurrently to FIGS. 3 to 7, it can be seen that a row of lip-fins 80 is provided on both the inner and outer lips 41 and 43. The lip-fins 80 are uniformly distributed along the inner and outer lips 41, 43. The lip-fins 80 enhance the heat transfer by increasing the cool side surface area. As best shown in FIGS. 4, 6 and 7, the lip-fins 80 have an extended end portion 80a which project rearwardly relative to the back face 91 of the dome heat shield panels 40 (i.e. downstream relative to the flow of cooling air). The extended end portions 80a of the lip-fins 80 form a linear array of heat promoting structures along both the inner and outer lips 41, 43 on the back face 91 of each dome heat shield panel 40. This contributes to further increase the cooling surface area.

Figure 8:
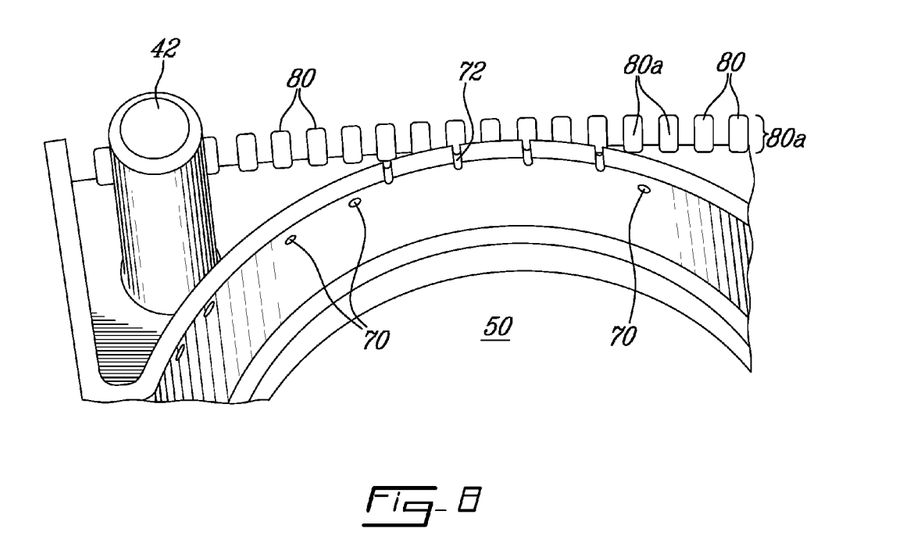
FIG. 8 is an enlarged rear isometric view of a section of a dome heat shield having outer rail impingement slots aimed at the lip-fins.

Impingement passages, such as impingement holes 70 in FIGS. 4 to 7 or impingement slots 72 in FIG. 8, are defined in each outer rail 66c. The impingement passages 70, 72 are aimed at the extended end portions 80a of the lip-fins 80 to direct impingement jets thereagainst. The extended end portion 80a of the lip-fins 80 provide a "target" for the air impingement jets passing through the outer rail impingement passages 70, 72. By so directing impingement jets against the lip-fins 80, cooling of the dome heat shield panels 40 can be further enhanced. This configuration uses coolant efficiently since the air: 1) cools the outer rails 66c as it passes through the impingement passages 70, 72; 2) cools the rearwardly extended ends 80a of the lip-fins 80 by impingement, and 3) cools the remainder of the lip-fins 80 by convection. As can be appreciated from FIGS. 2 and 7, the spent flow then serves as a starter film for adjacent inner and outer front heat shield panels 82, 84 respectively mounted to the inner and outer combustor liners 20a, 20b (see arrow in FIG. 2). The starter film a1 also serves to prevent carbon formation on the inner and outer front panels 82, 84 which are usually hit by the partially unburned fuel from the fuel nozzles 28. The soot left behind is then washed away by the starter film. In this way, the coolant is used 4 times (3 times to cool the dome heat shields and once to provide a film of cooling air over the adjacent inner and outer front heat shields).

As can be appreciated from FIG. 7, the region 86 of the front face 93 of the inner and outer front heat shield panels 82, 84 which overlap the adjacent inner and outer lips 41, 43 of the combustor dome heat shield panels 40 does not have a thermal barrier coating for better clearance or gap 95 control between the inner and outer front heat shields 82, 84 and the dome heat shields 40. This ensures proper cooling flow from the inner and outer lips 41, 43 to the front inner and outer heat shields 82, 84. Furthermore, the thickness of the thermal barrier coating 85 applied to the remainder of the front face of the heat shield panels 82, 84 may taper towards the uncoated overlapping region to avoid disturbing the cooling flow.

As shown in FIGS. 4 and 7, the outer rail impingement passage centerline C may be inclined relative to the back face of the dome heat shield panel 40 and oriented to clear the inner ring 66b. This aids in the manufacture of the dome heat shield panel. The outlet ends of the impingement passages are oriented towards the lip-fins 80 so that cooling air impinges on the lip-fins 80.

The fact that impingement passages 70, 72 are an integral part of the dome heat shield panels (i.e. not from a separate part of the shell) allow to use the coolant to convection cool the panel, before impinging on the rearwardly extended lip-fins 80. Therefore, the same cooling air can be used to: 1) convection cool the outer rail 66c, 2) impingement cool and 3) convection cool the dome panels 40 before being used as a starter film for the front inner and outer heat shields 82, 84. It is understood that the impingement passages 70 could be defined in another part or integral structure on the back of the dome heat shield panels 40.

In use, coolant air from the plenum 17 is directed into the air gap 60. Then, the cooling air flows through the impingement passages 70, 72, thereby cooling the outer rails 66c. The air then impinges upon the rearwardly extended end portion 80a of the lip-fins 80. After impinging against the extended end portions 80, the air flows over the inner and outer lips 41, 43, thereby further cooling the dome heat shield panels by convection. Finally, the air flows from the lips 41, 43 to the front heat shield panels 82, 84 to form a film of air over the front face 93 of the heat shield panels 82, 84. The spent flow from the lip-fins 80 is thus also used to cool the panels 82, 84 downstream and protect the panel front surface from soot deposition.

The above description is meant to be exemplary only, and one skilled in the art will recognize that changes may be made to the embodiments described without departing from the scope of the invention disclosed. For example, the invention can be provided in any suitable heat shield configuration and in any suitable combustor configuration, and is not limited to application in turbofan engines. It is understood that the principles of the inventions are not limited to combustor dome heat shields. It could be applied to other types of the combustor heat shields. Also the heat shield could have one or more peripheral lips. Still other modifications which fall within the scope of the present invention will be apparent to those skilled in the art, in light of a review of this disclosure, and such modifications are intended to fall within the appended claims.

What is claim is:

1. A heat shield for a combustor of a gas turbine engine, the heat shield comprising:
   a heat shield panel adapted to be mounted to an inside of a dome of the combustor with a back face of the heat shield panel in a spaced-apart facing relationship with an inner surface of the dome, the heat shield configured to receive a flow of cooling air along the back face of the heat shield panel;
   at least one radially inner lip or radially outer lip along a periphery of the heat shield panel and projecting forwardly from a forward face of the heat shield panel, the at east one of the radially inner lip or radially outer lip having a radially facing surface; and
   an array of lip-fins projecting radially from the radially facing surface of the at least one of the radially inner lip or radially outer lip, the lip-fins having extended end portions projecting rearwardly beyond the back face of the heat shield panel, the lip-fins also extending forwardly relative to the back face of the heat shield panel.

2. The heat shield defined in claim 1, wherein a rail projects from the back face of the heat shield panel about at least one fuel nozzle opening defined in the heat shield panel, and wherein a set of impingement passages is defined in said rail, the impingement passages being oriented toward said extended end portions of the lip-fins.

3. The heat shield defined in claim 1, wherein cooling passages are defined in said heat shield panel, said cooling passages being oriented toward said extended end portions of the lip-fins.

4. The heat shield defined in claim 3, wherein the cooling passages are defined in a structure projecting rearwardly from the back face of the heat shield panel, the structure being integral with the back face of the heat shield panel.

5. The heat shield defined in claim 4, wherein the structure includes a rail, and wherein the cooling passages are defined in the rail.

6. The heat shield defined in claim 5, wherein the cooling passages have an angular orientation relative to the back face of the heat shield panel.

7. The heat shield defined in claim 6, wherein the rail is an outer rail surrounding an inner ring on the back face of the heat shield panel about a fuel nozzle opening, and wherein a respective centerline of each impingement passage clears the inner ring.

8. A combustor comprising:
   a combustor shell circumscribing a combustion chamber, the combustor shell having a dome;
   at least one circumferential array of dome heat shield panels mounted to an inner side of the dome, the dome heat shield panels each having a forward face and a back face disposed in a spaced-apart facing relationship with the inner side of the dome, the back faces of the dome heat shield panels and the inner side of the dome defining can air gap therebetween;
   each of the dome heat shield panels respectively having a radially inner lip and a radially outer lip, the radially inner lip and the radially outer lip each projecting forwardly from the forward face and between opposed lateral edges, the radially inner lip and radially outer lip each having a radially facing surface; and
   inner and outer arrays of lip-fins respectively provided along the radially inner lip and radially outer lip of each dome heat shield panel, the lip-fins projecting radially from the respective radially facing surfaces of each radially inner lip and radially outer lip, the lip-fins having extended end portions projecting rearwardly beyond the back face of each of the dome heat shield panels, the lip-fins also extending forwardly relative to the back face of each of the dome heat shield panels.

9. The combustor defined in claim 8, further comprising impingement passages defined in each of the dome heat shield panels, the impingement passages being oriented toward the extended end portions of the lip-fins.

10. The combustor defined in claim 9, wherein the impingement passages are defined in respective sealing rails extending rearwardly from the back side of each of the dome heat shield panels.

11. The combustor defined in claim 10, wherein at least one fuel nozzle opening is defined in each of the dome heat shield panels, and wherein the sealing rails of each of the dome heat shield panels include an annular rail extending about the at least one fuel nozzle opening of each of the dome heat shield panels, the impingement passages being defined in said annular rail of each of the dome heat shield panels.

12. The combustor defined in claim 11, wherein the impingement passages are inclined relative to the back face of each of the dome heat shield panels, wherein the annular rail is an outer rail surrounding an inner ring on the back face of each dome heat shield panel, and wherein a respective centerline of each impingement passage clears the inner ring.

13. The combustor defined in claim 9, wherein each of said impingement passages has an inlet end in fluid flow communication with said air gap.

14. The combustor defined in claim 8, further comprising inner and outer front heat shield panels respectively mounted to radially inner and outer liners of the combustor shell, the inner and outer front heat shield panels having respective overlapping portions which overlap the inner and outer lips of the dome heat shield panels and define respective clearances therewith, the inner and outer lips of the dome heat shield panels being adjacent to the respective overlapping portions of the inner and outer front heat shield panels, respective front surfaces of said respective overlapping portions of the inner and outer front heat shield panels having no thermal barrier coating.

15. The combustor defined in claim 14, wherein the the inner and outer front heat shield panels each have a respective thermal barrier coating applied thereto outwardly of the respective overlapping portions, wherein the thicknesses of the thermal barrier coatings taper from a full thickness to zero at said respective overlapping portions.

16. A method of cooling combustor heat shield panels mounted in a combustor of a gas turbine engine, the method comprising:
    convection cooling a heat shield panel by passing coolant through impingement passages defined in the heat shield panel;
    impingement cooling the heat shield panel by directing coolant discharged from the impingement passages against extended end portions of peripheral lip-fins projecting radially from respective peripheral lips extending along radially inner and outer sides of the heat shield panel, the peripheral lip-fins and the peripheral lips protecting forwardly from a forward face of the heat shield panel, the extended end portions of the peripheral lip-fins projecting rearwardly beyond a back face of the heat shield panel; and
    convection cooling the peripheral lip-fins, using the coolant directed against the extended end portions of the peripheral lip-fins, by directing the coolant which has impinged against the extended end portions of the peripheral lip-fins forwardly over the peripheral lip-fins along the peripheral lips of the heat shield panel.

17. The method defined in claim 16, wherein the heat shield panel is a dome heat shield panel and is mounted to a dome of the combustor, and wherein the method further comprises using the coolant flowing over the peripheral lip-fins along the peripheral lips to form a coolant film over respective front faces of adjacent radially inner and radially outer front heat shield panels respectively mounted, adjacent to the dome heat shield panel, to radially inner and radially outer liners of the combustor.

* * * * *